SUPERCONDUCTOR MODULATOR

Filed Sept. 30, 1957

*INVENTOR.*
DONALD R. YOUNG
*BY*
John E Dougherty Jr
ATTORNEY

United States Patent Office 2,914,736

Patented Nov. 24, 1959

2,914,736

SUPERCONDUCTOR MODULATOR

Donald R. Young, Poughkeepsie, N.Y., assignor to International Business Machines Corporation, New York, N.Y., a corporation of New York Application September 30, 1957, Serial No. 687,226

10 Claims. (Cl. 332—51)

The present invention relates to superconductor devices for controlling the transmission of high frequency signals and more particularly to superconductor cavity resonators and coaxial transmission lines.

In the past, tuning in most cavity resonators and wave guide devices has been accomplished by mechanically adjustable parts which alter the resonant or transmitting frequency of the devices. Examples of devices of this type are found in Patents Nos. 2,761,106, 2,774,044 and 2,781,493 issued respectively to D. Q. Posin, J. O. Silvey, et al., and B. B. Cork, et al. Such devices, though valuable in certain applications, have the disadvantage that, since they rely on mechanical adjustment for tuning, they cannot be employed advantageously as, for example, devices for switching high frequency signals at high speeds.

A prime object of the present invention is to provide high frequency signal switching devices.

Another object is to provide a superconductor cavity resonator.

A further object is to provide a superconductor transmission line.

These objects are achieved, as is illustrated in the embodiments of the invention herein disclosed, by constructing cavity resonators and transmission lines with walls of superconductive material. The theory of superconductivity is discussed in detail in the following books: D. Shoenberg, "Superconductivity," second edition, The Syndics of the Cambridge University Press, London, England (1952); and M. Von Laue, "Theory of Superconductivity," Academic Press, New York (1952). More specific information pertinent to the theory of operation of the subject invention is found in the following articles: F. Bitter, et al., "Superconductivity of Lead at 3-Cm. Wave Lengths," Physical Review, vol. 70, pp. 97, 98 (1946); and E. Maxwell, et al., "Surface Impedance of Normal Superconductors at 24,000 Megacycles Per Second," Physical Review, vol. 76, pp. 1332 et seq. (1949). Briefly stated, superconductivity may be defined as the characteristic of certain materials, when cooled below particular transition temperatures in the vicinity of absolute zero, to lose all resistance and become perfect conductors. In the cavity resonator of the present invention a rectangular cavity having superconductive side walls is maintained at a temperature just below its particular transition temperature. The cavity is provided with an input coil which is coupled to an external radio frequency source and an output coil which is coupled to a detector. When the walls of the cavity are in a superconductive state, the frequency band of the resonator is determined by the geometry of the cavity and the impedance characteristics of the walls, which in the superconductive state exhibit no resistance and which, in accordance with another characteristic of the superconductive state, can be penetrated by magnetic flux lines only to an extremely limited depth, commonly referred to as the penetration depth. The cavity is provided with a coil which is effective when energized to apply sufficient magnetic field to the superconductor walls to cause a transition back to the resistive state. Both the real and imaginary parts of the complex impedance of these walls is thereby altered since the resistance of the walls is increased and the depth to which magnetic flux can penetrate the walls is no longer limited to the penetration depth of the superconductor material. The cavity may thus be utilized as a device for switching or modulating high frequency signals at either or both of these frequency bands of the resonator. The switch passes signals in the first frequency band as long as the control coil is not energized and conversely passes signals in the second frequency band when the control coil is energized.

In accordance with another embodiment of the invention a coaxial transmission line is provided wherein the outer walls are of a superconductor material maintained just below its transition temperature. The outer walls are embraced by a coil which, when energized, drives the wall into a normal or resistive state thereby altering the attenuation of the line.

In each of the above embodiments the superconductor walls are driven from a superconductive to a resistive state by a magnetizing force, supplied in the embodiments by a constant pitch control coil, which drives the entire section of the walls associated with the coil into a normal state when a particular critical value of control current is exceeded. The devices, therefore, exhibit two different states. These two states and a number of states intermediate them may be realized by controlling the state of the walls with magnetizing means which are controllable to successively drive greater portions of the walls from the superconductive to the normal state. Reference may be made to copending application, Serial No. 677,239, filed August 9, 1957, in behalf of D. R. Young, wherein other superconductive devices employing magnetizing means of this type are shown and described.

A high frequency transmission device of this nature is shown in a further embodiment where a variable pitch control coil is utilized to control the impedance characteristics of the walls and, therefore, the transmission characteristics of the resonator.

Thus a further object of the invention is to provide high frequency modulating devices having superconductor walls wherein the transmission characteristics of the devices are controlled by applying magnetizing forces to the superconductor walls.

A feature of the invention lies in the provision of devices of this nature wherein a wide range of transmission characteristics are achieved by utilizing, as a control element, magnetizing means which is effective as the magnitude of energizing current therethrough is increased to drive increasing portions of the walls from a superconductive to a normal state.

These and other objects of the invention will be pointed out in the following description and claims and illustrated in the accompanying drawings, which disclose, by way of example, the principle of the invention and the best mode, which has been contemplated, of applying the principle.

Figure 1:
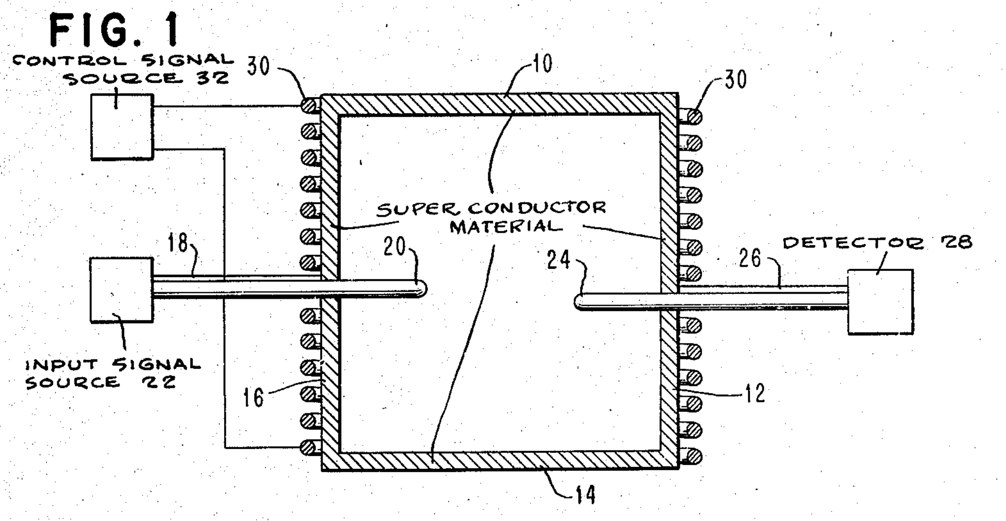
Figs. 1 and 2 are cross sectional views of embodiments of cavity resonators constructed in accordance with the principles of the invention.

Fig. 1 shows a cavity resonator constructed in accordance with the principles of the invention. The cavity itself is rectangular in form comprising the four walls 10, 12, 14, and 16. These walls are made of a superconductive material and the cavity is maintained at a temperature slightly below the transition temperature for the material. The temperature may be attained by utilizing liquid helium which, at atmospheric pressure, has a boiling point of 4.2° K. For information on various superconductive materials of the type which may be employed, their transition temperatures and methods of attaining the desired temperature for the material utilized, reference may be made to an article by D. Buck entitled "The Cryotron, A Superconductive Computer Component," which appeared in the April 1956, issue of the Proceedings of the IRE, at pp. 482–493.

Radio frequency inputs are supplied to the cavity by a conductor 18 terminated within the cavity in a coil 20. The input signals are supplied to the conductor from a source 22 which may, for example, be a receiver receiving signals at a variety of different frequencies. The receiver need not be maintained at the low helium temperature. Outputs are taken by way of a further coil 24 coupled by a conductor 26 to a detecting or utilization device represented schematically to the box designated 28.

A constant pitch coil 30 is wound to embrace the cavity with the coil itself adjacent walls 12 and 16. The coil 30 is coupled to a signal source 32 which may be selectively actuated to cause current flow through the coil 30. The coil, when thus energized, applies to the walls 12 and 16 a magnetic field of sufficient intensity to switch the walls from a superconductive to a normal state. Since the complex impedance of the walls 12 and 16 is changed by this switching of the walls from the superconductive to the normal state, both the amplitude of the reflected waves, and the phase relationship of the reflected to incident waves radiated from coil 20, are changed. If, for example, the geometry of the cavity and the positioning of the coils 20 and 24 is such that the cavity is resonant at a frequency or frequency band $f_1$ when the walls 12 and 16 are in a superconductive state and, therefore, an appreciable output at this frequency is induced in coil 24 and detached at 28, the energization of coil 30, by altering the impedance characteristics of walls 12 and 16, changes the frequency or frequency band for the cavity to a new value of $f_2$ and only signals at this frequency radiating from coil 20 are transmitted through the cavity to produce a significant output at 28.

The cavity may, therefore, be employed as a switch for controlling the transmission of signals at frequencies $f_1$ or $f_2$, or $f_1$ and $f_2$ applied by the source 22. When signal or control source 32 is actuated to energize coil 30, the switch is closed to pass signals at frequency $f_2$ but is open to signals at frequency $f_1$. When coil 30 is deenergized, the switch is closed to pass signals at frequency $f_1$ but is open to signals at frequency $f_2$. Rather than simple on-off type amplitude modulation, the resonator may be utilized to modulate input signals at frequencies $f_1$ and $f_2$ with the signals applied to 30 by source 32. However the frequency of the modulating signal supplied by source 32 to coil 30 must be below an upper limit which is determined principally by the thickness of walls 12 and 16. This limit upon the frequency of the modulating signal is due to the fact that a magnetic field, in excess of the critical field, applied at the outer surfaces of walls 12 and 16 does not immediately penetrate through the walls 12 and 16 to the inner surfaces thereof but there is a time delay due to eddy current effects and the extent of this delay is proportionate to the thickness of walls 12 and 16.

Figure 2:
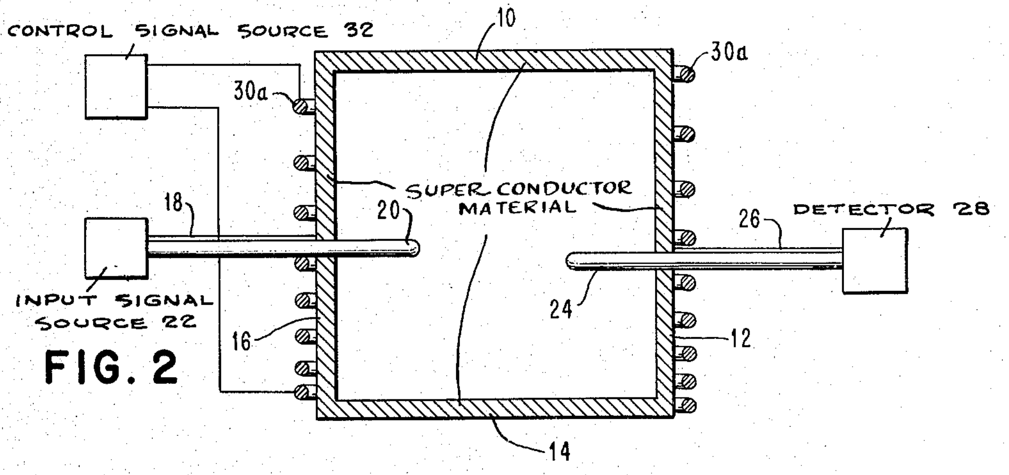

The embodiment of Fig. 2 is the same as that of Fig. 1 with the exception that the constant pitch coil 30 of Fig. 1 has been replaced by a variable pitch coil 30*a*. Thus, for any value of current flow through coil 30*a*, the intensity of the magnetizing force along the coil varies. The most intense field exists where the coil pitch is lowest and the least intense field exists where the coil pitch is highest. Therefore, the critical value of coil current necessary to switch the portions of walls 12 and 16 adjacent the tightly wound windings at one end of coil 30 is less than that necessary to switch the portion of the walls adjacent the loosely wound windings at the other end of this coil and, by varying the current flow between these two values, different portions of the walls 12 and 16 can be caused to switch from one state to the other. The frequency band of the cavity itself is, of course, changed as current is changed between these upper and lower limits so that modulation and switching of signals in a number of distinct frequency bands between the limiting frequency bands $f_1$ and $f_2$ can be achieved.

Figure 3:
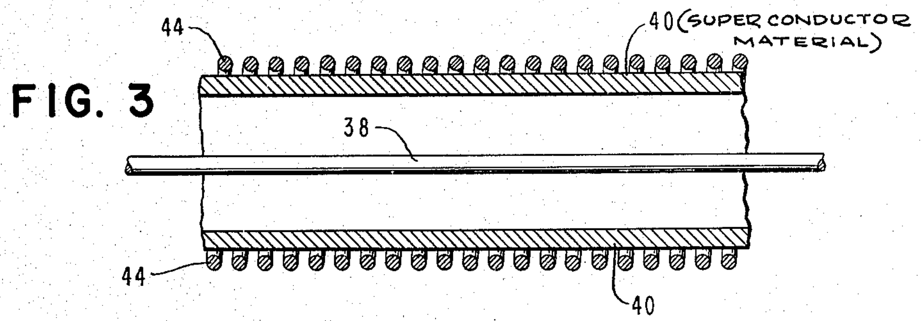
Fig. 3 is a schematic showing of a transmission line constructed in accordance with the principles of the invention.

Fig. 3 illustrates a further embodiment of the invention wherein a coaxial transmission line is constructed employing a center conductor 38 and an outer wall conductor 40. Wall 40 is made of a superconductive material and, as in the above embodiments, the structure is maintained at a temperature below the transition temperature for the superconductive material used so that, by energizing a coil 44, the wall may be driven from a superconducting to a normal state, thereby increasing the attenuation of signals being transmitted. Therefore, the coaxial line shown performs not only the function of a transmission line but also may be simultaneously employed to modulate the amplitude of signals being transmitted in accordance with signals applied to coil 44. Though only a portion of the line is shown and coil 44 is shown to have a constant pitch, it should be understood that variable pitch coils may be utilized to broaden the range of modulation and that the coil may be wound along the entire length of the line or along only a portion of its length.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a resonator circuit, a plurality of walls forming a cavity, at least one of said walls being formed of superconductive material, means for maintaining said superconductive material at a temperature in the vicinity of the temperature at which it undergoes a transition from a normal to a superconductive state, and means associated with said wall of superconductive material for applying a magnetic field thereto for controlling the state of said superconductive material.

2. A device for controlling the transmission of electromagnetic waves comprising a body having at least a first wall of superconductive material, means for maintaining said wall at a temperature in the vicinity of the temperature at which it undergoes a transition from a normal to a superconductive state, and means associated with said wall for applying magnetic fields thereto for controlling the state of said superconductive material and thereby both the resistance presented by said walls to said waves and the depth to which they penetrate said walls.

3. The invention as claimed in claim 2 wherein said wall of superconductive material is one of a plurality of walls defining the cavity in a cavity resonator.

4. The invention as claimed in claim 2 wherein said wall of superconductive material comprises at least a portion of the outer wall of a coaxial transmission line.

5. The invention as claimed in claim 2 wherein said means for applying magnetic fields comprises a variable pitch control coil associated with said wall.

6. A resonator circuitry comprising four walls forming a cavity, at least two of said walls being of a superconductor material, means maintaining said superconductor walls at a temperature below the temperature at which it undergoes a transition from a normal to a superconductive state, a conductor embracing said cavity and in close proximity to said superconductor walls, and means coupled to said conductor to energize said conductor and thereby render it effective to switch said walls from a superconductive to a normal state.

7. A device for controlling the transmission of electromagnetic waves, said device defining a structure in which said waves are propagated; the characteristics of said device depending upon its geometry and the impedance characteristics of the material of said structure, at least a section of said structure comprising superconductor material, means maintaining said section at a temperature below its transition temperature, and coil means associated with said section for applying magnetic fields thereto to destroy superconductivity therein and thereby alter both the conductivity of said section and the depth to which said waves penetrate said section.

8. The invention as claimed in claim 7 wherein said coil means comprise a varying pitch coil effective when energized to apply different intensities of magnetic field to different portions of said section of superconductive material.

9. A resonator circuitry comprising four walls forming a cavity, at least two of said walls being of a superconductor material, means maintaining said superconductor walls at a temperature below the temperature at which said material undergoes a transition from a normal to a superconductive state, a coil embracing said cavity and in close proximity to said superconductor walls, input means for radiating electromagnetic waves in said cavity, output means responsive to electromagnetic waves in said cavity, and means coupled to said coil for applying energizing signals to said coil and destroying superconductivity in portions of said walls varying in accordance with the magnitude of said signals to thereby control the transmission of electromagnetic waves through said cavity.

10. A modulator comprising a cavity defined by a structure at least a portion of which comprises superconductor material, means for maintaining said material at a temperature below its transition temperature, means for radiating signals to be modulated in said cavity, means for receiving signals modulated in said cavity, and means for modulating said signal comprising means for applying magnetic fields to said portion of superconductor material to destroy superconductivity in said material and thereby alter both the real and imaginary parts of the complex impedance presented by said portion of superconductor material to said radiated signals.

References Cited in the file of this patent

UNITED STATES PATENTS

| | | |
|---|---|---|
| 2,197,123 | King | Apr. 16, 1940 |
| 2,725,474 | Ericsson et al. | Nov. 29, 1955 |
| 2,784,378 | Yager | Mar. 5, 1957 |
| 2,798,205 | Hogan | July 2, 1957 |